(12) United States Patent
Akkarakaran et al.

(10) Patent No.: US 11,950,220 B2
(45) Date of Patent: Apr. 2, 2024

(54) SIDELINK CARRIER AGGREGATION CROSS CARRIER SCHEDULING

(71) Applicant: QUALCOMM Incorporated, San Diego, CA (US)

(72) Inventors: Sony Akkarakaran, Poway, CA (US); Jung Ho Ryu, Fort Lee, NJ (US); Tao Luo, San Diego, CA (US); Junyi Li, Fairless Hills, PA (US); Peter Gaal, San Diego, CA (US); Jelena Damnjanovic, Del Mar, CA (US); Juan Montojo, San Diego, CA (US); Jing Sun, San Diego, CA (US); Xiaoxia Zhang, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/401,126

(22) Filed: Aug. 12, 2021

(65) Prior Publication Data
US 2022/0053511 A1    Feb. 17, 2022

Related U.S. Application Data

(60) Provisional application No. 63/066,007, filed on Aug. 14, 2020.

(51) Int. Cl.
*H04W 72/12* (2023.01)
*H04W 72/23* (2023.01)
(Continued)

(52) U.S. Cl.
CPC ....... *H04W 72/1215* (2013.01); *H04W 72/23* (2023.01); *H04W 72/535* (2023.01); *H04W 88/06* (2013.01)

(58) Field of Classification Search
None
See application file for complete search history.

(56) References Cited

U.S. PATENT DOCUMENTS

2017/0048829 A1    2/2017  Kim et al.
2017/0078863 A1    3/2017  Kim et al.
(Continued)

FOREIGN PATENT DOCUMENTS

WO    WO2022010119    *    1/2022

OTHER PUBLICATIONS

Intel Corporation: "Carrier Aggregation Over PC5", 3GPP Draft, 3GPP TSG RAN WG2 Meeting #99, R2-1709048, Carrier Aggregation Over PC5, 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017 (Aug. 20, 2017), XP051318841, 4 Pages, Retrieved from the Internet: URL: http://www.3gpp.org/ftp/Meetings_3GPP_SYNC/RAN2/Docs/. [Retrieved on Aug. 20, 2017] The Whole Document.

(Continued)

*Primary Examiner* — Mohammad S Adhami
(74) *Attorney, Agent, or Firm* — Arent Fox, LLP

(57) ABSTRACT

This disclosure relates to the cross carrier scheduling of sidelink carrier aggregation, and includes a method and apparatus for determining a component carrier (CC) index for at least one of a first sidelink transmission with a second UE and a Uu transmission with a network entity, the CC index indicating one or more CCs among which at least one of the first sidelink transmission and the Uu transmission occur; and communicating at least one of the first sidelink transmission to the second UE and the Uu transmission to the network entity based on the CC index.

27 Claims, 9 Drawing Sheets

(51) Int. Cl.
*H04W 72/50* (2023.01)
*H04W 88/06* (2009.01)

(56) References Cited

U.S. PATENT DOCUMENTS

| | | | | |
|---|---|---|---|---|
| 2020/0022175 | A1 | 1/2020 | Xiong et al. | |
| 2020/0396760 | A1* | 12/2020 | Yi | H04L 1/1864 |
| 2021/0105126 | A1* | 4/2021 | Yi | H04L 1/1671 |
| 2021/0337527 | A1* | 10/2021 | Hui | H04W 72/20 |
| 2022/0394702 | A1* | 12/2022 | Lee | H04L 1/1812 |

OTHER PUBLICATIONS

Intel Corporation: "Sidelink Carrier Aggregation for Lte V2V Communication", 3GPP Draft, 3GPP TSG RAN WG1 Meeting #89, R1-1707300, Intel—V2X_SLCA, 3RD Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 14, 2017 (May 14, 2017), XP051272513, 8 pages.
International Search Report and Written Opinion—PCT/US2021/045988—ISA/EPO—dated Dec. 2, 2021.

* cited by examiner

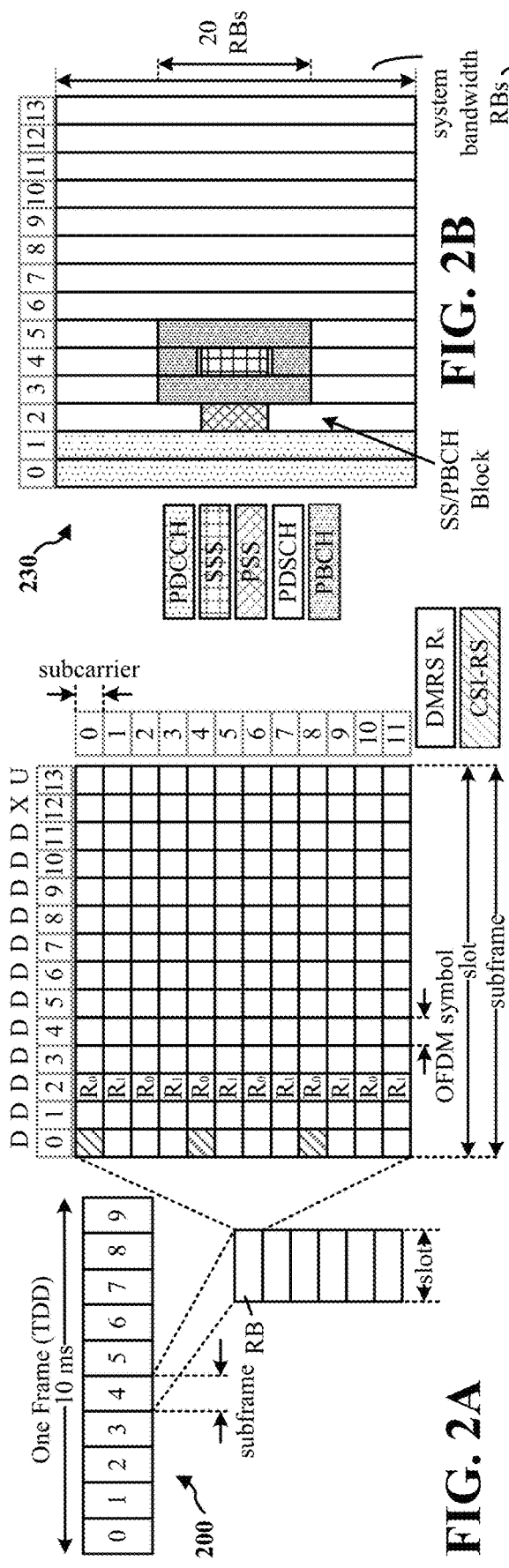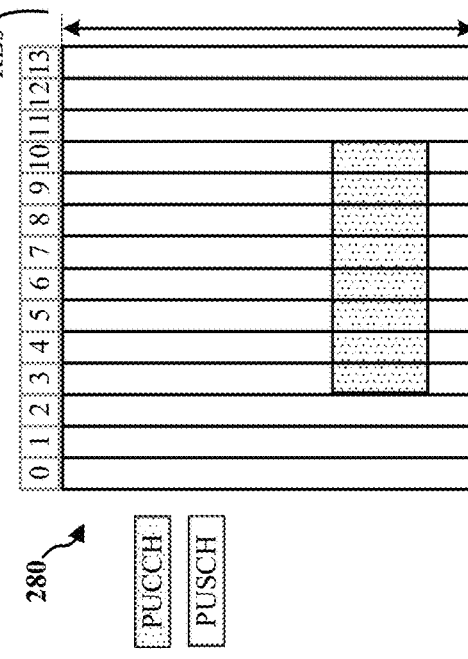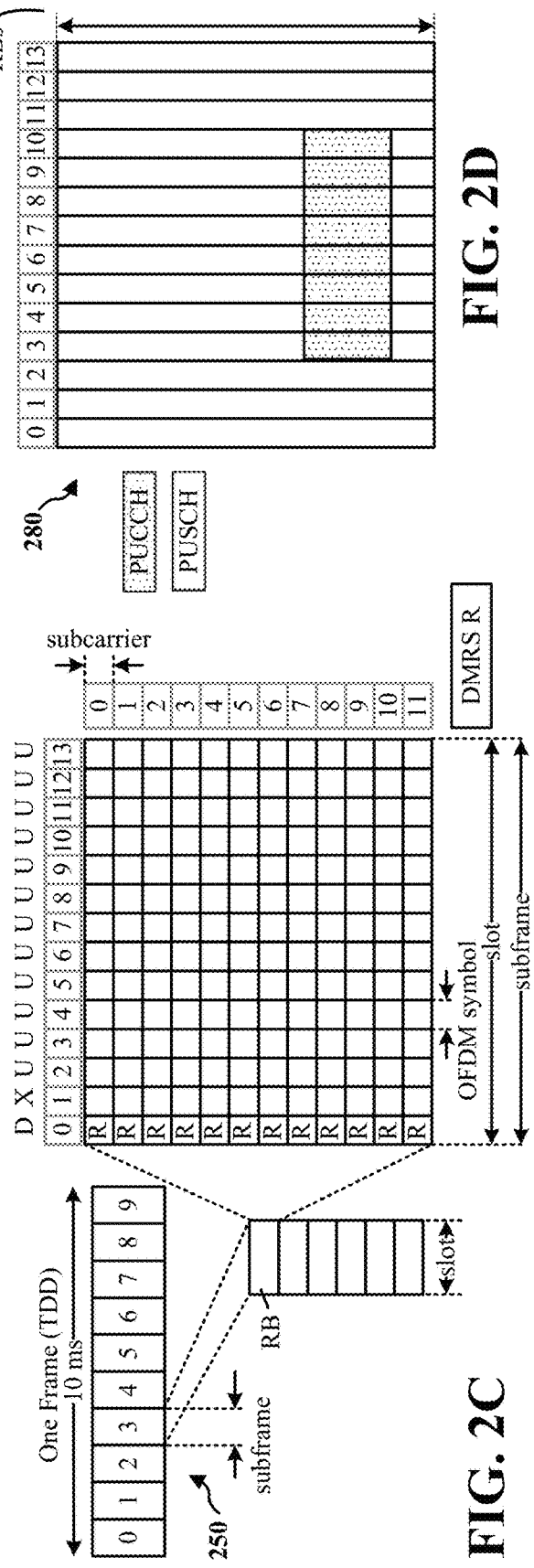

SIDELINK CARRIER AGGREGATION CROSS CARRIER SCHEDULING

CROSS-REFERENCE TO RELATED APPLICATION(S)

The present application claims benefit of U.S. Provisional Application No. 63/066,007 entitled "SIDELINK CARRIER AGGREGATION CROSS CARRIER SCHEDULING" filed Aug. 14, 2020, which is assigned to the assignee hereof and hereby expressly incorporated by reference herein.

BACKGROUND

The present disclosure relates generally to communication systems, and more particularly, to cross carrier scheduling of sidelink carrier aggregation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a first user equipment (UE), comprising determining a component carrier (CC) index for at least one of a first sidelink transmission with a second UE and a Uu transmission with a network entity, the CC index indicating one or more CCs among which at least one of the first sidelink transmission and the Uu transmission occur; and communicating at least one of the first sidelink transmission to the second UE and the Uu transmission to the network entity based on the CC index.

In a further example, an apparatus for wireless communication is provided that includes a transceiver, a memory configured to store instructions, and one or more processors communicatively coupled with the transceiver and the memory. The one or more processors are configured to execute the instructions to determine a CC index for at least one of a first sidelink transmission with a second UE and a Uu transmission with a network entity, the CC index indicating one or more CCs among which at least one of the first sidelink transmission and the Uu transmission occur; and communicate at least one of the first sidelink transmission to the second UE and the Uu transmission to the network entity based on the CC index.

In another aspect, an apparatus for wireless communication is provided that includes means for determining a CC index for at least one of a first sidelink transmission with a second UE and a Uu transmission with a network entity, the CC index indicating one or more CCs among which at least one of the first sidelink transmission and the Uu transmission occur; and communicating at least one of the first sidelink transmission to the second UE and the Uu transmission to the network entity based on the CC index.

In yet another aspect, a non-transitory computer-readable medium is provided including code executable by one or more processors to determine a CC index for at least one of a first sidelink transmission with a second UE and a Uu transmission with a network entity, the CC index indicating one or more CCs among which at least one of the first sidelink transmission and the Uu transmission occur; and communicate at least one of the first sidelink transmission to the second UE and the Uu transmission to the network entity based on the CC index.

According to another example, a method of wireless communication at a network entity, comprising transmitting a cross-carrier scheduling indication to a first UE, the cross-carrier scheduling indication including one or more carrier indicator fields (CIFs) configured to determine a CC index for at least one of a first sidelink transmission between the first UE and a second UE and a Uu transmission with a network entity, the CC index indicating one or more CCs among which at least one of the first sidelink transmission and the Uu transmission occur; and receiving the Uu transmission from the first UE in response to transmitting the cross-carrier scheduling indication, wherein the Uu transmission occurs on the one or more CCs.

In a further example, an apparatus for wireless communication is provided that includes a transceiver, a memory configured to store instructions, and one or more processors communicatively coupled with the transceiver and the memory. The one or more processors are configured to execute the instructions to transmit a cross-carrier scheduling indication to a first UE, the cross-carrier scheduling indication including one or more CIFs configured to determine a CC index for at least one of a first sidelink transmission between the first UE and a second UE and a Uu transmission with a network entity, the CC index indicating one or more CCs among which at least one of the first sidelink transmission and the Uu transmission occur; and receive the Uu transmission from the first UE in response to transmitting the cross-carrier scheduling indication, wherein the Uu transmission occurs on the one or more CCs.

In another aspect, an apparatus for wireless communication is provided that includes means for transmitting a cross-carrier scheduling indication to a first UE, the cross-carrier scheduling indication including one or more CIFs configured to determine a CC index for at least one of a first sidelink transmission between the first UE and a second UE and a Uu transmission with a network entity, the CC index indicating one or more CCs among which at least one of the first sidelink transmission and the Uu transmission occur; and receiving the Uu transmission from the first UE in response to transmitting the cross-carrier scheduling indication, wherein the Uu transmission occurs on the one or more CCs.

In yet another aspect, a non-transitory computer-readable medium is provided including code executable by one or more processors to transmit a cross-carrier scheduling indication to a first UE, the cross-carrier scheduling indication including one or more CIFs configured to determine a CC index for at least one of a first sidelink transmission between the first UE and a second UE and a Uu transmission with a network entity, the CC index indicating one or more CCs among which at least one of the first sidelink transmission and the Uu transmission occur; and receive the Uu transmission from the first UE in response to transmitting the cross-carrier scheduling indication, wherein the Uu transmission occurs on the one or more CCs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1 in accordance with one or more aspects of the present disclosure.

DETAILED DESCRIPTION

Figure 1:
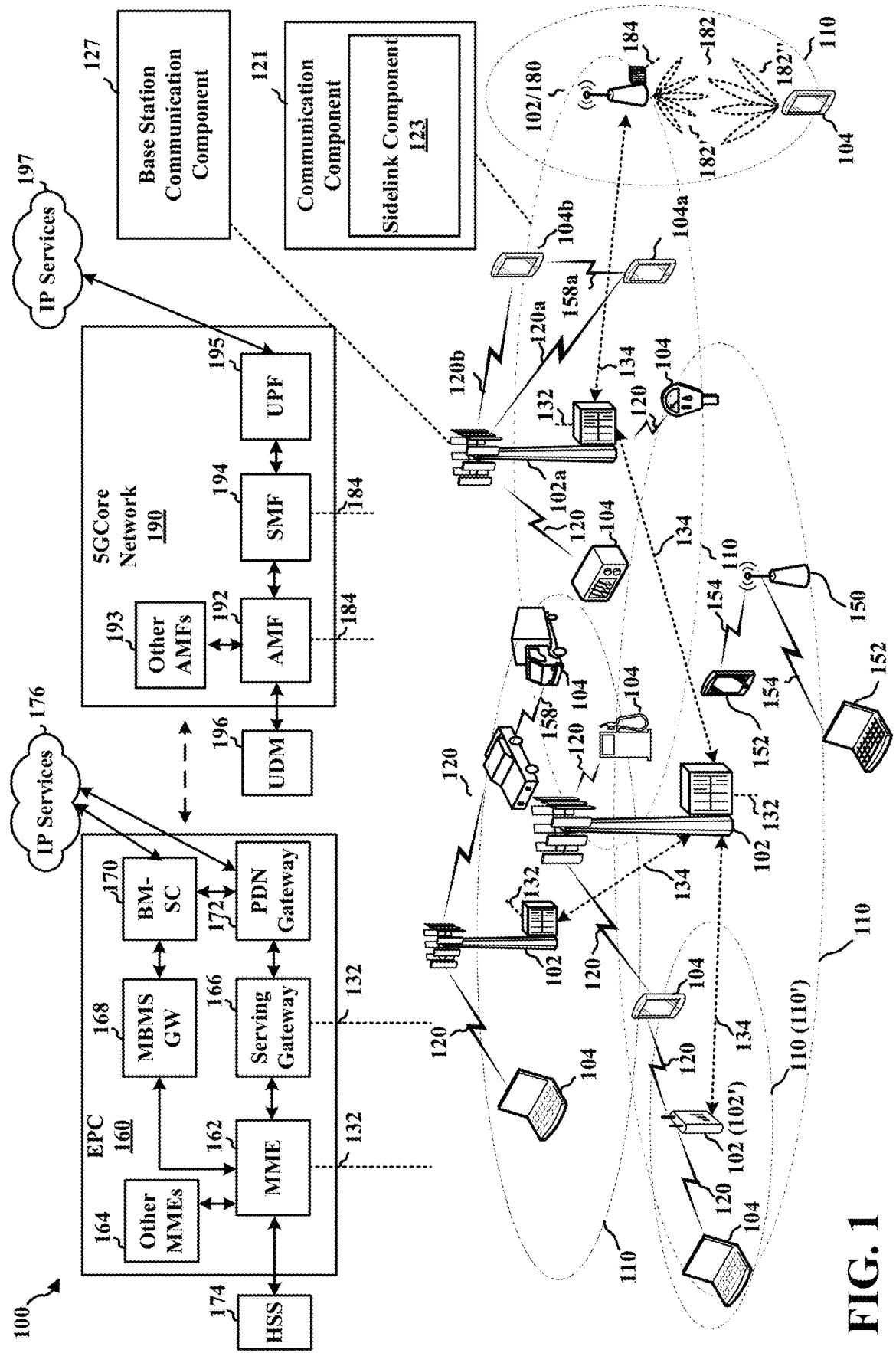
FIG. 1 is a schematic diagram of an example of a wireless communications system and an access network in accordance with one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to sidelink communications, which includes a user equipment (UE) communicating from a base station over a sidelink to a remote UE, or from the remote UE to the base station via the UE. The sidelink may include a physical sidelink shared channel (PSSCH) and a physical sidelink control channel (PSCCH). The PSSCH may carry sidelink data between the first UE and the second UE. Sidelink transmission may be defined as a one-to-many scheme, meaning that the data may be received by multiple UEs that belong to a group. The PSCCH may carry the sidelink control information (SCI), which may include information about the resource allocation of the PSSCH.

Specifically, the present disclosure relates to enhancements to the sidelink communications, and in particular, to sidelink carrier aggregation and multi-component carrier (CC) grants. In device-to-device (D2D) communication systems operating according to a New Radio (NR) scheme, which may include a UE in communication with both a network entity and a second UE, carrier aggregation may be implemented on a sidelink between the UE and the second UE. That is, the carriers forming the PSSCH and/or PSCCH may be aggregated to increase the overall transmission bandwidth and, consequently, the achievable data rates on the aforementioned communication channels (e.g., PSSCH and PSCCH). Each aggregated carrier may correspond to a CC. Further, each CC may be of a certain bandwidth and may not exceed a maximum number of aggregated carriers. Although carrier aggregation may be useful in high data rate applications in D2D communication systems, an implementation of carrier aggregation may result in an increased complexity.

As such, the present disclosure mitigates the implementation complexity and potentially negative impacts on UEs by enhancing sidelink carrier aggregation for high data-rate applications such as for NCIS or V2X. Specifically, present disclosure relates to enhancements to cross carrier scheduling of sidelink carrier aggregation.

In an aspect, the present disclosure provides apparatus and methods for determining a component carrier (CC) index for at least one of a first sidelink transmission with a second UE and a Uu transmission with a network entity, the CC index indicating one or more CCs among which at least one of the first sidelink transmission and the Uu transmission occur; and communicating at least one of the first sidelink transmission to the second UE and the Uu transmission to the network entity based on the CC index.

In an aspect, the present disclosure provides apparatus and methods for transmitting a cross-carrier scheduling indication to a first UE, the cross-carrier scheduling indication including one or more carrier indicator fields (CIFs) configured to determine a CC index for at least one of a first sidelink transmission between the first UE and a second UE and a Uu transmission with a network entity, the CC index indicating one or more CCs among which at least one of the first sidelink transmission and the Uu transmission occur; and receiving the Uu transmission from the first UE in response to transmitting the cross-carrier scheduling indication, wherein the Uu transmission occurs on the one or more CCs.

These and other features of the present disclosure are discussed in detail below with regard to FIGS. 1-9.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a UE 104*b* may include a communication component 121 for assisting with sidelink communications between a base station 102*a* and a UE 104*a*. The UE 104*a* may have a first access link 120*a* directly with the base station 102*a*, and a second communication link with the base station 102*a* via a sidelink 158*a* with the UE 104*b*, which has a second access link 120*b* to the base station 102*a*. The communication component 121 of the UE 104*b* may include a sidelink component 123, which may be selectively configured to cross carrier schedule of sidelink carrier aggregation.

Correspondingly, the UE 104*a* may be configured to manage communications with both the UE 104*b* via the sidelink 158*a* and the base station 102*a* via the access link 120*a*.

Similarly, the base station 102*a* may include a base communication component 127 configured to manage communications with both the UE 104*b* via the access link 120*b* and the UE 104*a* via the access link 120*a*.

Further details of these operations performed by the UE 104*b*, the UE 104*a*, and the base station 102*a* are discussed in more detail below.

The base stations 102, including base station 102*a*, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including UE 104*b* and UE 104*a*. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104, such as UE 104b and UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
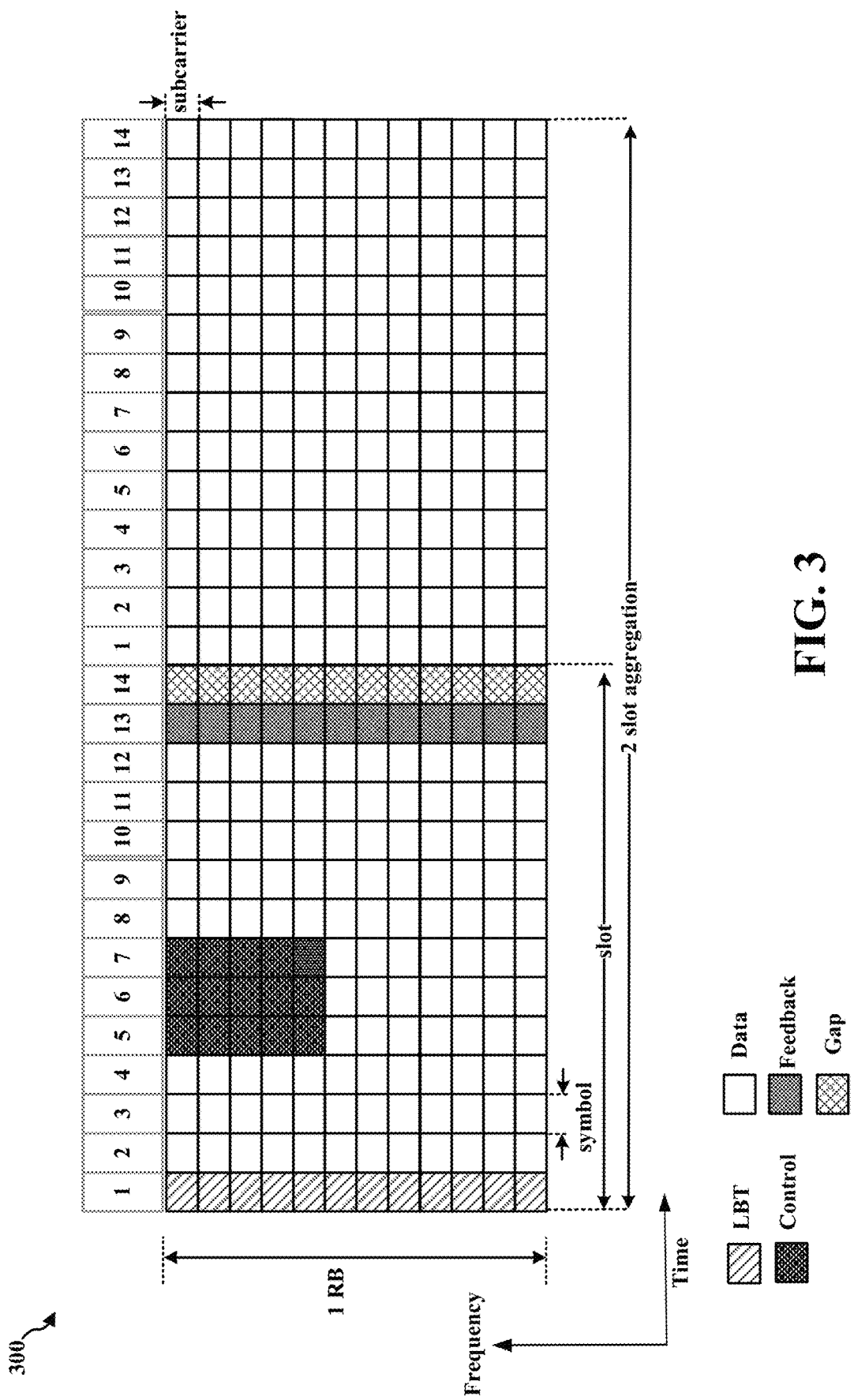
FIG. 3 is a diagram of an example frame structure and resources for sidelink communications between two of the communicating nodes in the system of FIG. 1 in accordance with one or more aspects of the present disclosure.

FIG. 3 is a diagram 300 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
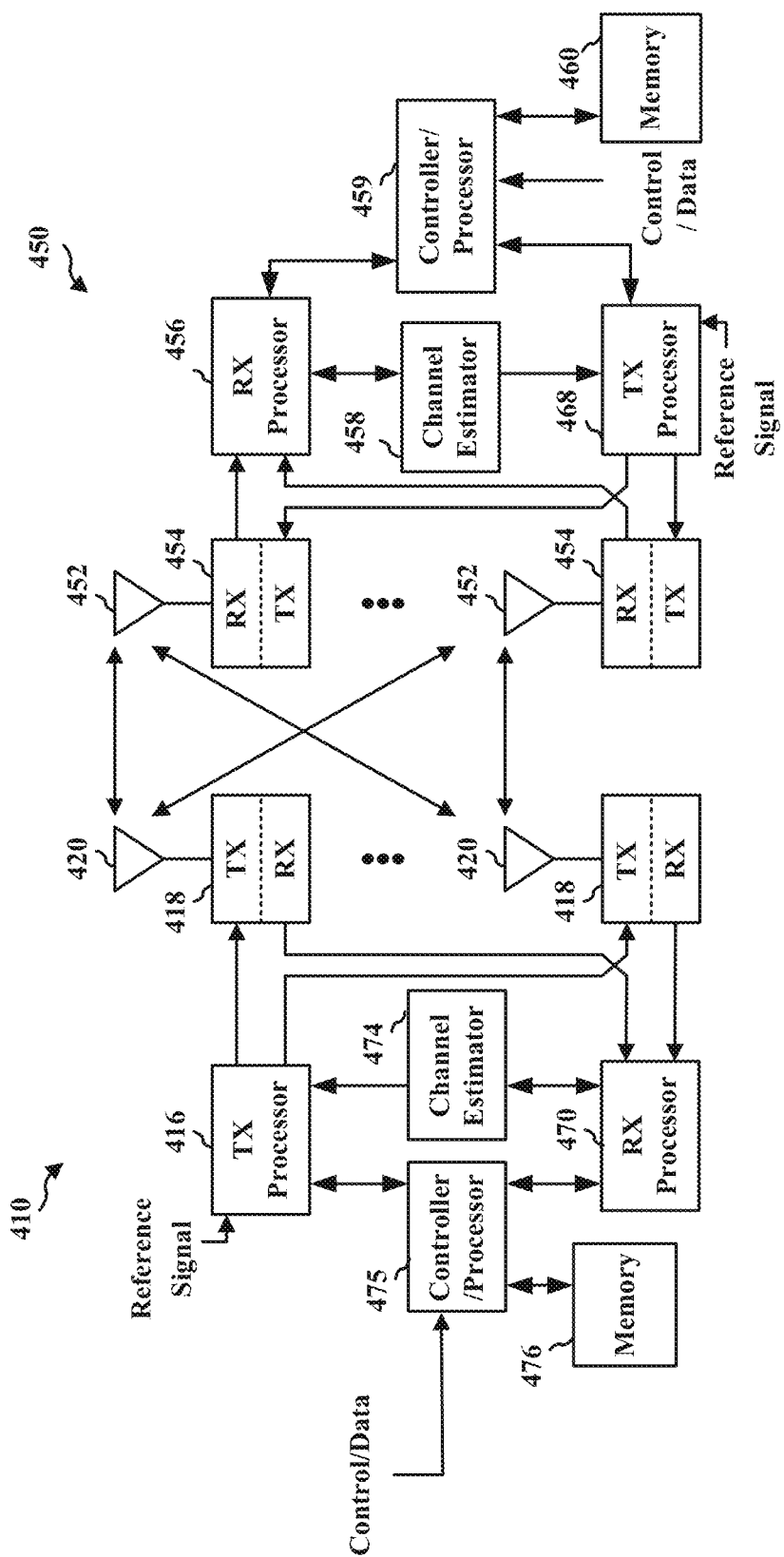
FIG. 4 is a schematic diagram of an example of hardware components of two of the communicating nodes in the system of FIG. 1 in accordance with one or more aspects of the present disclosure.

FIG. 4 is a diagram of hardware components of an example transmitting and/or receiving (TX/RX) nodes 410 and 450, which may be any combinations of base station 102-UE 104 communications, and/or UE 104-UE 104 communications in system 100. For example, such communications may including, but are not limited to, communications such as a base station transmitting to a UE, a UE transmitting to a remote UE, a remote UE transmitting to a UE, or a UE transmitting to a base station in an access network. In one specific example, the TX/RX node 410 may be an example implementation of base station 102 and where TX/RX node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the TX/RX node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the TX/RX node 450. If multiple spatial streams are destined for the TX/RX node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the TX/RX node 410. These soft decisions may be based on channel estimates computed by the channel estimator 458. The soft decisions are then decoded and deinterleaved to recover the data and control signals that were originally transmitted by the TX/RX node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the TX/RX node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the TX/RX node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the TX/RX node 410 in a manner similar to that described in connection with the receiver function at the TX/RX node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, 125, and/or 127 of FIG. 1.

In an implementation, at least one of the TX processor 416, the RX processor 470, and the controller/processor 475 may be configured to perform aspects in connection with components 121, 125, and/or 127 of FIG. 1.

Figure 5:
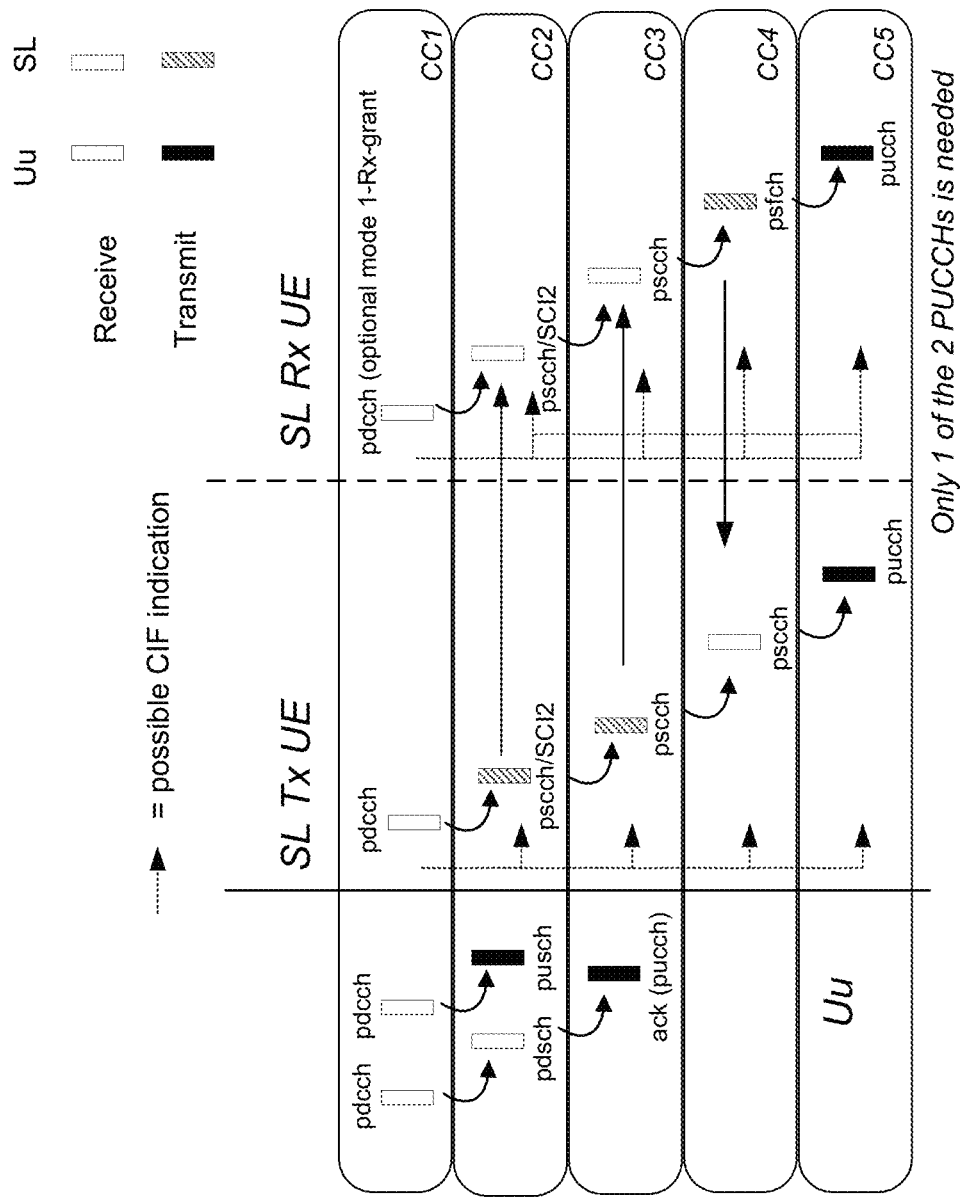
FIG. 5 is a schematic diagram of an example of cross carrier scheduling for a base station, sidelink transmitting UE, and a sidelink receiving UE.

FIG. 5 is a schematic diagram 500 of an example of cross carrier scheduling for a base station, sidelink transmitting UE, and a sidelink receiving UE. For example, a network entity, such as base station 102, may be configured to communicate with a sidelink transmitting UE (SL Tx UE), such as UE 104b, and a sidelink receiving UE (SL Rx UE), such as UE 104a.

In an aspect, one or more carrier indicator fields (CIFs) may be required in Mode 1. For example, a starting PDCCH in CC1 transmitted by the base station to at least one of the SL Tx UE or the SL Rx UE may carry all of the one or more CIFs for PSCCH (in CC2), PSSCH (in CC3), Physical Sidelink Feedback Channel (PSFCH) (in CC4), and PUCCH (in CC5). The starting PDCCH in CC1 schedules and reserves resources for all transmissions including PSCCH, PSSCH, PSFCH, and PUCCH. In some implementations, one or more of the CIFs may be carried in PSCCH (e.g., sidelink control information 1 (SCI1) or SCI2) if for example SL Rx UE does not receive PDCCH from the base station indicating the scheduling of PSCCH/PSSCH. In another implementation, one or more of the CIFs may be identified based on an implicit rule-based indication (e.g. a rule indicating that the PSCCH and the PSSCH are associated in a same CC). In another implementation, a PUCCH CC may be identified by identifying a PUCCH group. A PUCCH group is a group of CCs where the PUCCH corresponding to any transmissions in any CC of the group of CC is transmitted in a designated CC that is associated with the PUCCH group. Only one PUCCH CC may be associated per PUCCH group. The PUCCH group may be associated with a CC of at least one of the PDCCH, PSCCH, PSSCH, or PSFCH. For example, a PUCCH group may be composed of CC1 and CC2 and the CC in which PUCCH is transmitted may be CC3, and if PDCCH, PSCCH, PSSCH or PSFCH is transmitted in either of CC1 or CC2, then the PUCCH corresponding the PDCCH/PSCCH/PSSCH/PSFCH is transmitted in CC3. CC3 may be the same either CC1 or CC2, or different from both CC1 and CC2. The PUCCH group may be identified by the CC that the PDCCH (e.g., with the Mode 1 sidelink grant) was transmitted. In another example, instead of configuring the CC that carried the PDCCH, the CC that carried at least one of the PSCCH, PSSCH, and PSFCH may be configured.

In an aspect, a CC may be identified by identifying a PSFCH group. For example, the PSFCH group may correspond to a group of sidelink CCs for which the PSFCH is sent only in a CC corresponding to that group. For example, PSFCH group may be composed of CC1 and CC2 and the CC in which PSFCH is sent is CC3. If PSCCH or PSSCH is sent in either CC1 or CC2, the PSFCH corresponding the PSCCH or the PSSCH is sent in CC3. In some implementations, cross CC PSCCH-to-PSSCH may be enabled only within a PSFCH group. That is cross CC scheduling may occur only among CCs that are in the same PSFCH group. In another implementation, the PSFCH group may be aligned with the PUCCH group (i.e., PSFCH and PUCCH groups are composed of the same CCs) but the PSFCH and the PUCCH may be transmitted on different CCs. i.e., in our preceding examples on PUCCH group and PSFCH group, CC3 for PUCCH group is different from CC3 for PSFCH group In some aspect, multiple grants may be included in one PDCCH from the base station. In one instance, each of the multiple grants may have a CIF indicating the CC in which the grant is to be applied. Hence, the PDCCH may include multiple CIFs. In another instance, the PDCCH may include only one CIIF and that CIF will point to a group of CCs, and it would be interpreted by the PDCCH receiving UE that the first grant in the PDCCH is to be applied in a first CC within the group, the second grant to be applied in a second CC, and so on.

Figure 6:
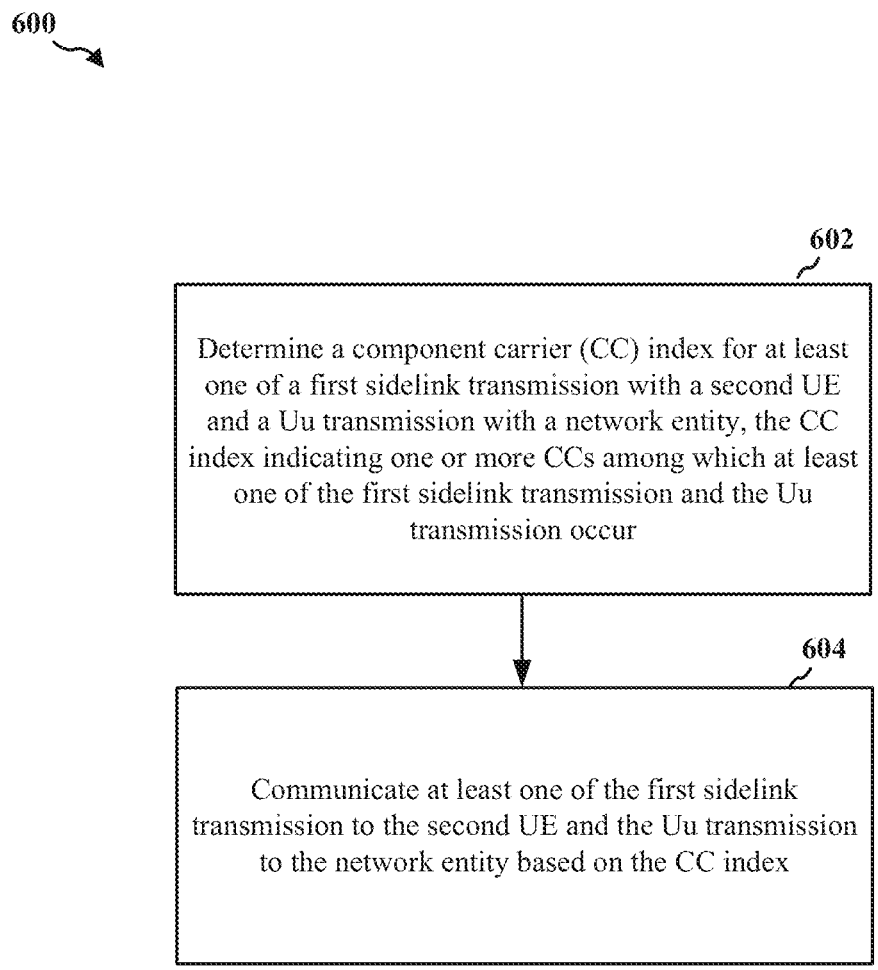
FIG. 6 is a flowchart of an example method of wireless communication of a first UE operable in the system of FIG. 1 in accordance with one or more aspects of the present disclosure.
Figure 8:
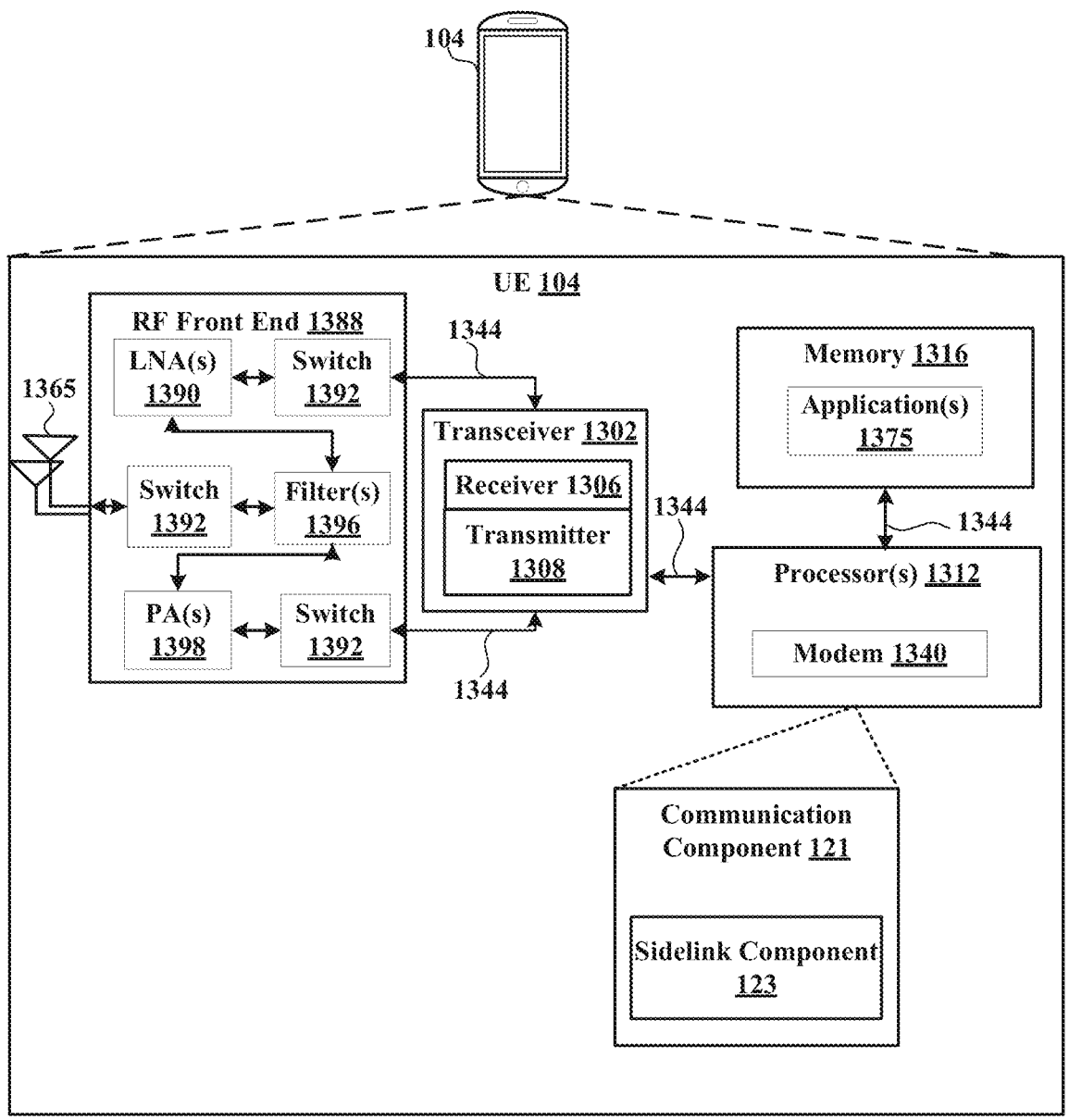
FIG. 8 is a block diagram of an example UE, in accordance with various aspects of the present disclosure.

Referring to FIG. 6, an example method 600 of wireless communication may be performed by the UE 104b, which may include one or more components as discussed in FIG. 1, 4, or 8, and which may be configured for cross carrier scheduling of sidelink carrier aggregation as discussed above with regard to FIGS. 1-4.

At 602, method 600 includes determining a CC index for at least one of a first sidelink transmission with a second UE and a Uu transmission with a network entity, the CC index indicating one or more CCs among which at least one of the first sidelink transmission and the Uu transmission occur. For example, in an aspect, the UE 104b may operate one or any combination of antennas 865, RF front end 888, transceiver 802, processor 812, memory 816, modem 840, or communication component 121 in combination with the sidelink component 123 to determine a CC index for at least one of a first sidelink transmission with a second UE 104a and a Uu transmission with a network entity 102, the CC index indicating one or more CCs among which at least one of the first sidelink transmission and the Uu transmission occur. Thus, the UE 104b, antennas 865, RF front end 888, transceiver 802, processor 812, memory 816, modem 840, and communication component 121 may define the means for determining a CC index for at least one of a first sidelink transmission with a second UE and a Uu transmission with a network entity, the CC index indicating one or more CCs among which at least one of the first sidelink transmission and the Uu transmission occur. For example, in an aspect, the UE 104b and/or the sidelink component 123 may process a signal to determine a CC index, and/or performs other signal processes such as described above with respect to FIG. 8.

At 604, method 600 includes communicating at least one of the first sidelink transmission to the second UE and the Uu transmission to the network entity based on the CC index. For example, in an aspect, the UE 104b may operate one or any combination of antennas 865, RF front end 888, transceiver 802, processor 812, memory 816, modem 840, or communication component 121 in combination with the sidelink component 123 to communicate at least one of the first sidelink transmission to the second UE and the Uu transmission to the network entity based on the CC index. Thus, the UE 104b, antennas 865, RF front end 888, transceiver 802, processor 812, memory 816, modem 840, and communication component 121 may define the means for communicating at least one of the first sidelink transmission to the second UE and the Uu transmission to the network entity based on the CC index. For example, in an aspect, the UE 104b and/or the sidelink component 123 may process a sidelink transmission into a signal, and transmit the signal, and/or performs other signal processes such as described above with respect to FIG. 8.

In some implementations of method 600, the communicating component 121, such as in conjunction with sidelink component 123, transceiver 802, processor 812, memory 816, or modem 840, is configured to receive a cross-carrier scheduling indication from the network entity, the cross-carrier scheduling indication including one or more carrier indicator fields (CIFs); and wherein determining the CC index for at least one of the first sidelink transmission with the second UE and the Uu transmission with the network entity further comprises determining the CC index based on the cross-carrier scheduling indication.

In some implementations of method 600, the cross-carrier scheduling indication corresponds to a PDCCH transmission received on a first CC of the group of CCs.

In some implementations of method 600, the one or more CIFs indicate a group of CCs, and wherein at least one of the first sidelink transmission and the Uu transmission occur in one or more CCs of the group of CCs.

In some implementations of method 600, the one or more CIFs are included in at least one DCI of the cross-carrier scheduling indication.

In some implementations of method 600, the cross-carrier scheduling indication of the CC index is included in at least one of a Uu media access control (MAC) control element (CE), a DCI or a second sidelink transmission.

In some implementations of method 600, the second sidelink transmission corresponds to at least one of a PSCCH, a SCI1, an Nth stage SCI (SCI-N), a physical sidelink shared channel (PSSCH), or a sidelink MAC CE.

In some implementations of method 600, the cross-carrier scheduling indication of the CC index is received at least one of by the first UE corresponding to a transmitter of one or more sidelink transmissions and a second UE corresponding to a receiver of the one or more sidelink transmissions.

In some implementations of method 600, the communicating component 121, such as in conjunction with sidelink component 123, transceiver 802, processor 812, memory 816, or modem 840, configured to determining the CC index for at least one of the first sidelink transmission with the second UE and the Uu transmission with the network entity further comprises determining the CC index based on a preconfigured rule-based indication.

In some implementations of method 600, the preconfigured rule-based indication identifies that a PSCCH and a PSSCH share a single CC from the group of CCs.

In some implementations of method 600, the communicating component 121, such as in conjunction with sidelink component 123, transceiver 802, processor 812, memory 816, or modem 840, is configured to determining a PUCCH group based on the CC index for at least one of the first sidelink transmission with the second UE and the Uu transmission with the network entity.

In some implementations of method 600, the PUCCH group is associated with a single CC in which a PUCCH is transmitted.

In some implementations of method 600, the determining of the PUCCH group is based on one or more CCs in which in at least one of a PSCCH, PSSCH, and PSFCH is transmitted.

In some implementations of method 600, the communicating component 121, such as in conjunction with sidelink component 123, transceiver 802, processor 812, memory 816, or modem 840, configured to determining the PUCCH group further comprises determining the PUCCH group based on a CC that a PDCCH transmission from the network entity occurs.

In some implementations of method 600, the communicating component 121, such as in conjunction with sidelink component 123, transceiver 802, processor 812, memory 816, or modem 840, is configured to determining a PSFCH group based on the CC index for at least one of the first sidelink transmission with the second UE and the Uu transmission with the network entity.

In some implementations of method 600, the PSFCH group is associated with a group of sidelink CCs that includes the PSFCH CC in which a PSFCH transmission occurs.

In some implementations of method 600, the communicating component 121, such as in conjunction with sidelink component 123, transceiver 802, processor 812, memory 816, or modem 840, is configured to determining that a cross CC transmission is scheduled for a first CC and a second CC, wherein the first CC differs from the second CC; determining that the first CC and the second CC are associated with the PSFCH group; and enabling scheduling of the cross CC transmission for the first CC and the second CC based on the determination that the first CC and the second CC are associated with the PSFCH group.

In some implementations of method 600, the first CC corresponds to a PSCCH transmission and the second CC corresponds to a PSSCH transmission.

In some implementations of method 600, the first sidelink transmission corresponds to at least one of a PSCCH, PSSCH, PSFCH, sidelink channel state information reference signal (SL CSI-RS), or SL-CSI report.

In some implementations of method 600, the Uu transmission corresponds to at least one of an acknowledgement (ACK)/negative acknowledgement (NACK) in response to receipt of a sidelink ACK/NACK from the second UE, a report of sidelink channel state information/positioning state information (CSI/PSI) transmitted in response to a receipt of the SL CSI/PSI, or a measurement of received SL CSI-RS/sidelink position reference signal (SL PRS).

Figure 7:
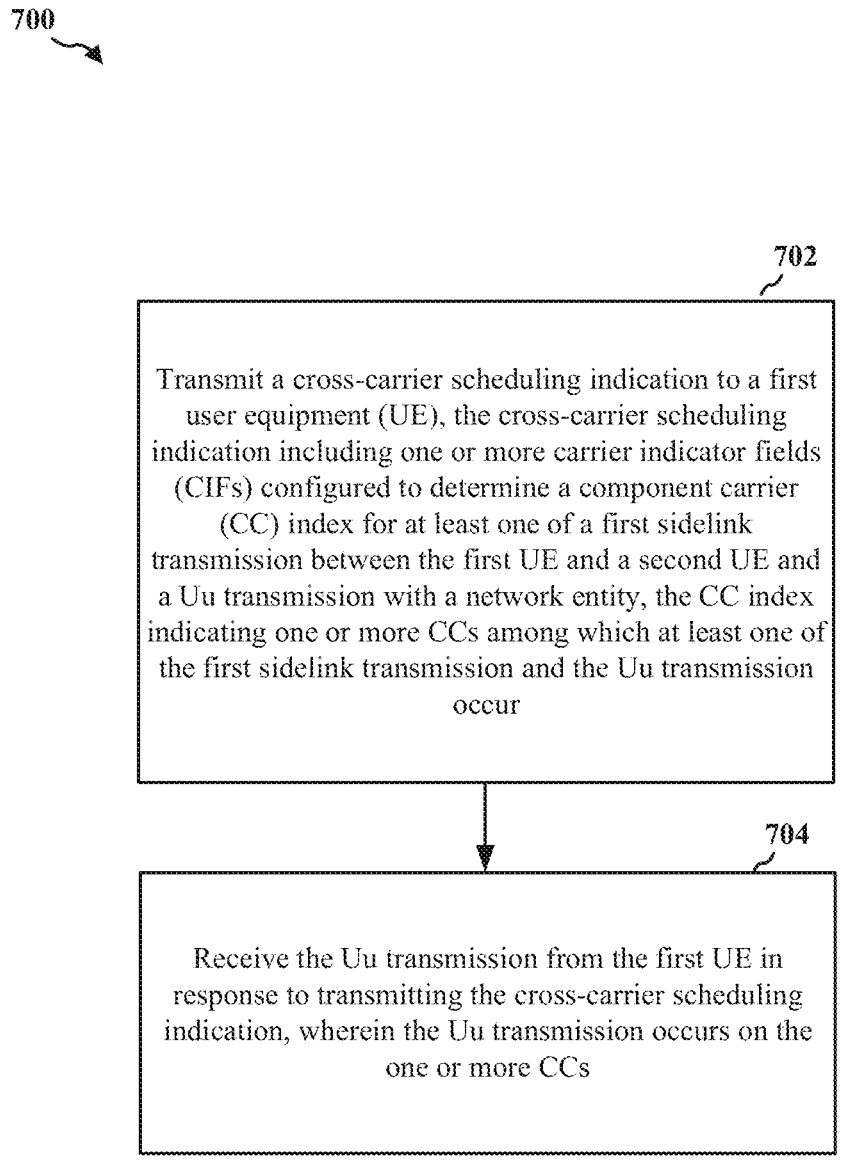
FIG. 7 is a flowchart of another example method of wireless communication of a network entity operable in the system of FIG. 1 in accordance with one or more aspects of the present disclosure.
Figure 9:
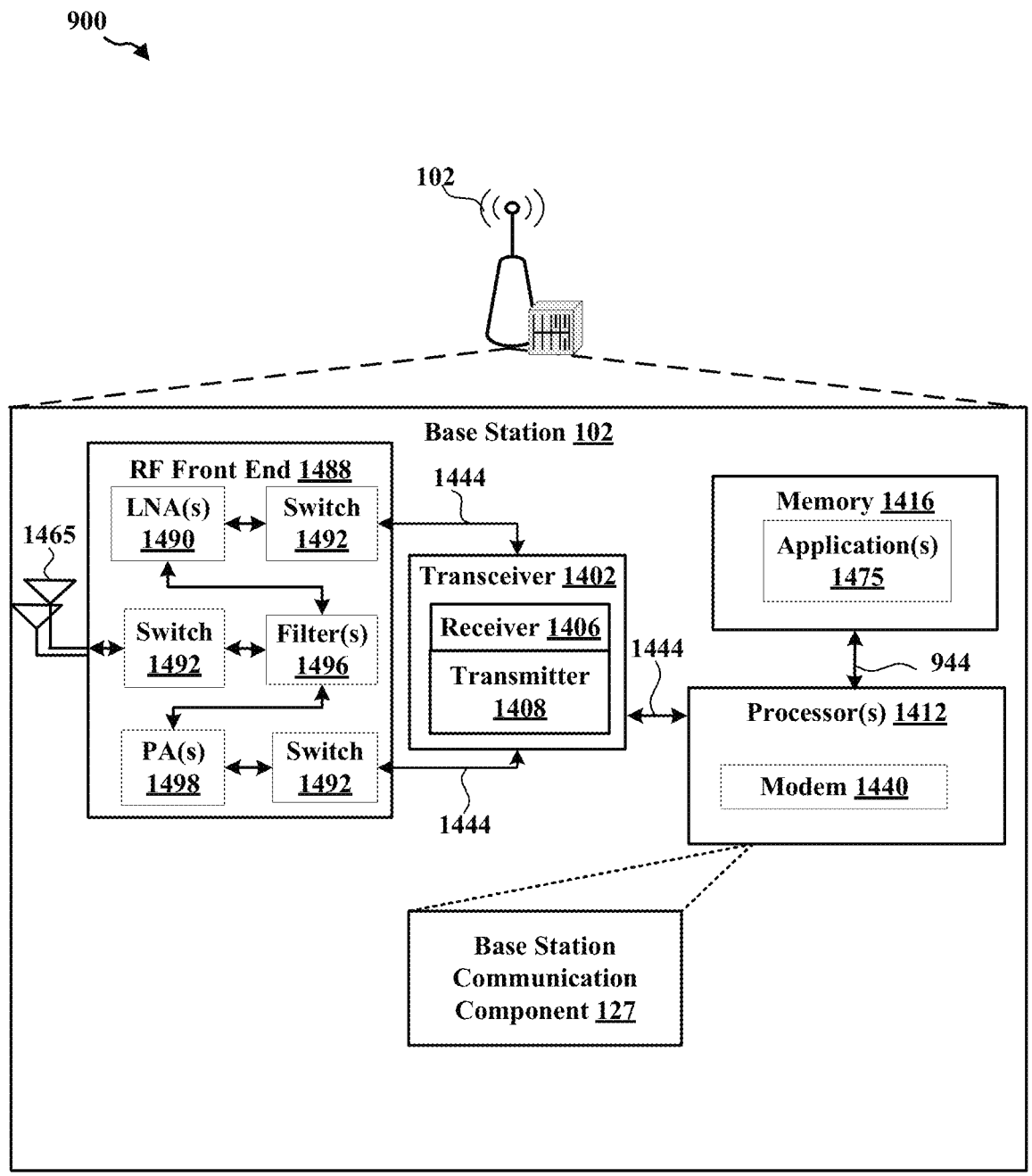
FIG. 9 is a block diagram of an example base station, in accordance with various aspects of the present disclosure.

Referring to FIG. 7, an example method 700 of wireless communication may be performed by the network entity 102, which may include one or more components as discussed in FIG. 1, 4, or 9, and which may be configured for cross carrier scheduling of sidelink carrier aggregation as discussed above with regard to FIGS. 1-4.

At 702, method 700 includes transmitting a cross-carrier scheduling indication to a first UE, the cross-carrier scheduling indication including one or more CIFs configured to determine a CC index for at least one of a first sidelink transmission between the first UE and a second UE and a Uu transmission with a network entity, the CC index indicating one or more CCs among which at least one of the first sidelink transmission and the Uu transmission occur. For example, in an aspect, the network entity 102 may operate one or any combination of antennas 965, RF front end 988, transceiver 902, processor 912, memory 916, modem 940, or base station communication component 127 to transmit a cross-carrier scheduling indication to a first UE, the cross-carrier scheduling indication including one or more CIFs configured to determine a CC index for at least one of a first sidelink transmission between the first UE and a second UE and a Uu transmission with a network entity, the CC index indicating one or more CCs among which at least one of the first sidelink transmission and the Uu transmission occur. Thus, the network entity 102, antennas 965, RF front end 988, transceiver 902, processor 912, memory 916, modem 940, and base station communication component 127 may define the means for transmitting a cross-carrier scheduling indication to a first UE, the cross-carrier scheduling indication including one or more CIFs configured to determine a CC index for at least one of a first sidelink transmission between the first UE and a second UE and a Uu transmission with a network entity, the CC index indicating one or more CCs among which at least one of the first sidelink transmission and the Uu transmission occur. For example, in an aspect, the network entity 102 and/or the communication component 127 may process a cross-carrier scheduling indication into a signal, and transmit the signal, and/or performs other signal processes such as described above with respect to FIG. 9.

At 704, method 700 includes receiving the Uu transmission from the first UE in response to transmitting the cross-carrier scheduling indication, wherein the Uu transmission occurs on the one or more CCs. For example, in an aspect, the network entity 102 may operate one or any combination of antennas 965, RF front end 988, transceiver 902, processor 912, memory 916, modem 940, or base station communication component 127 to receive the Uu transmission from the first UE in response to transmitting the cross-carrier scheduling indication, wherein the Uu transmission occurs on the one or more CCs. Thus, the network entity 102, antennas 965, RF front end 988, transceiver 902, processor 912, memory 916, modem 940, and base station communication component 127 may define the means for receiving the Uu transmission from the first UE in response to transmitting the cross-carrier scheduling indication, wherein the Uu transmission occurs on the one or more CCs. For example, in an aspect, the network entity 102 and/or the communication component 127 may receive a signal, and process the signal into a Uu transmission, and/or performs other signal processes such as described above with respect to FIG. 9.

In some implementations of method 700, the cross-carrier scheduling indication corresponds to a PDCCH transmission transmitted on a first CC of the group of CCs.

In some implementations of method 700, the one or more CIFs indicate a group of CCs, and wherein at least one of the first sidelink transmission and the Uu transmission occur in one or more CCs of the group of CCs.

In some implementations of method 700, the one or more CIFs are included in at least one DCI of the cross-carrier scheduling indication.

In some implementations of method 700, the cross-carrier scheduling indication of the CC index is included in at least one of a Uu MAC CE, a DCI or a second sidelink transmission.

In some implementations of method 700, the second sidelink transmission corresponds to at least one of a PSCCH, a SCI1, an SCI-N, a PSSCH, or a MAC CE.

In some implementations of method 700, the cross-carrier scheduling indication of the CC index is received at least one of by the first UE corresponding to a transmitter of one or more sidelink transmissions and a second UE corresponding to a receiver of the one or more sidelink transmissions.

In some implementations of method 700, the CC index for at least one of the first sidelink transmission with the second UE and the Uu transmission with the network entity is based on a preconfigured rule-based indication.

In some implementations of method 700, the preconfigured rule-based indication identifies that a PSCCH and a PSSCH share a single CC from the group of CCs.

In some implementations of method 700, the communicating component 127, such as in conjunction with transceiver 902, processor 912, memory 916, or modem 940, is configured to determine a PUCCH group based on the CC index for at least one of the first sidelink transmission with the second UE and the Uu transmission with the network entity.

In some implementations of method 700, the PUCCH group is associated with a single CC in which a PUCCH is received.

In some implementations of method 700, the determining the PUCCH group is based on one or more CCs in which at least one of a PSCCH, PSSCH, and PSFCH is transmitted.

In some implementations of method 700, the communicating component 127, such as in conjunction with transceiver 902, processor 912, memory 916, or modem 940, configured to determine the PUCCH group further comprises determining the PUCCH group based on a CC that a PDCCH transmission from the network entity occurs.

In some implementations of method 700, the communicating component 127, such as in conjunction with transceiver 902, processor 912, memory 916, or modem 940, is configured to determine a PSFCH group based on the CC index for at least one of the first sidelink transmission with the second UE and the Uu transmission with the network entity.

In some implementations of method 700, the PSFCH group is associated with a group of sidelink CCs that includes the PSFCH CC in which a PSFCH transmission occurs.

In some implementations of method 700, the communicating component 127, such as in conjunction with transceiver 902, processor 912, memory 916, or modem 940, is configured to determine that a cross CC transmission is scheduled for a first CC and a second CC, wherein the first CC differs from the second CC; determining that the first CC and the second CC are associated with the PSFCH group; and enabling scheduling of the cross CC transmission for the first CC and the second CC based on the determination that the first CC and the second CC are associated with the PSFCH group.

In some implementations of method 700, the first CC corresponds to a PSCCH transmission and the second CC corresponds to a PSSCH transmission.

In some implementations of method 700, the first sidelink transmission corresponds to at least one of a PSCCH, PSSCH, PSFCH, SL CSI-RS, or SL-CSI report.

In some implementations of method 700, the Uu transmission corresponds to at least one of an ACK/NACK in response to receipt of a sidelink ACK/NACK from the second UE, a report of sidelink CSI/PSI transmitted in response to a receipt of the SL CSI/PSI, or a measurement of received SL CSI-RS/SL PRS.

Referring to FIG. 10, one example of an implementation of UE 104, including UE 104b and/or UE 104a, may include a variety of components, some of which have already been described above and are described further herein, including components such as one or more processors 812 and memory 816 and transceiver 802 in communication via one or more buses 844, which may operate in conjunction with modem 840 and/or communication component 121 and sidelink component 123 configured to cross carrier scheduling of sidelink carrier aggregation.

In an aspect, the one or more processors 812 can include a modem 840 and/or can be part of the modem 840 that uses one or more modem processors. Thus, the various functions related to configuration component 198 may be included in modem 840 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 840 associated with communication component 121 may be performed by transceiver 802.

Also, memory 816 may be configured to store data used herein and/or local versions of applications 875 or communicating component 842 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining communication component 121 and/or one or more of its subcomponents, and/or data associated therewith, when UE 104 is operating at least one processor 812 to execute configuration component 198 and/or one or more of its subcomponents.

Transceiver 802 may include at least one receiver 806 and at least one transmitter 808. Receiver 806 may include hardware and/or software executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, signal-to-noise ratio (SNR), reference signal received power (RSRP), received signal strength indicator (RSSI), etc. Transmitter 808 may include hardware and/or software executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. The one or more antennas 865 may include one or more antenna panels and/or sub-arrays, such as may be used for beamforming. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 840 can configure transceiver 802 to operate at a specified frequency and power level based on the UE configuration of the UE 104 and the communication protocol used by modem 840.

In an aspect, modem 840 can be a multiband-multimode modem, which can process digital data and communicate with transceiver 802 such that the digital data is sent and received using transceiver 802. In an aspect, modem 840 can be multiband and be configured to support multiple frequency bands for a specific communications protocol. In an aspect, modem 840 can be multimode and be configured to support multiple operating networks and communications protocols. In an aspect, modem 840 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 812 may correspond to one or more of the processors described in connection with the UE in FIG. 4. Similarly, the memory 816 may correspond to the memory described in connection with the UE in FIG. 4.

Referring to FIG. 9, one example of an implementation of base station 102 (e.g., a base station 102, 102*a*, and/or 102*b*, as described above) may include a variety of components, some of which have already been described above, but including components such as one or more processors 912 and memory 916 and transceiver 902 in communication via one or more buses 944, which may operate in conjunction with modem 940 and base station communication component 127 configured to set-up, activation, and deactivation of sidelink carrier aggregation.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

In an aspect, the processor(s) 912 may correspond to one or more of the processors described in connection with the base station in FIG. 4. Similarly, the memory 916 may correspond to the memory described in connection with the base station in FIG. 4.

The following aspects and examples are illustrative only. These examples and their aspects may be combined with aspects of other embodiments or teachings described herein, without limitation.

In a first aspect, a method is performed by a first user equipment (UE). The method includes determining a component carrier (CC) index for at least one of a first sidelink transmission with a second UE and a Uu transmission with a network entity, the CC index indicating one or more CCs among which at least one of the first sidelink transmission and the Uu transmission occur; and communicating at least one of the first sidelink transmission to the second UE and the Uu transmission to the network entity based on the CC index.

In a second aspect, the method of aspect 1 includes receiving a cross-carrier scheduling indication from the network entity, the cross-carrier scheduling indication including one or more carrier indicator fields (CIFs); and wherein determining the CC index for at least one of the first sidelink transmission with the second UE and the Uu transmission with the network entity further comprises determining the CC index based on the cross-carrier scheduling indication.

In a third aspect, the method of any of aspects 1 and 2 include the cross-carrier scheduling indication corresponds to a physical downlink control channel (PDCCH) transmission received on a first CC of the group of CCs.

In a fourth aspect, the method of any of aspects 1 and 2 include the one or more CIFs indicate a group of CCs, and wherein at least one of the first sidelink transmission and the Uu transmission occur in one or more CCs of the group of CCs.

In a fifth aspect, the method of any of aspects 1 and 2 include the one or more CIFs are included in at least one downlink control information (DCI) of the cross-carrier scheduling indication.

In a sixth aspect, the method of any of aspects 1 and 2 include the cross-carrier scheduling indication of the CC index is included in at least one of a Uu media access control (MAC) control element (CE), a downlink control information (DCI) or a second sidelink transmission.

In a seventh aspect, the method of any of aspects 1, 2, and 6 include the second sidelink transmission corresponds to at least one of a physical sidelink control channel (PSCCH), a sidelink control information 1 (SCI1), an Nth stage SCI (SCI-N), a physical sidelink shared channel (PSSCH), or a sidelink media access control (MAC) control element (CE).

In an eighth aspect, the method of any of aspects 1 and 2 include the cross-carrier scheduling indication of the CC index is received at least one of by the first UE corresponding to a transmitter of one or more sidelink transmissions and a second UE corresponding to a receiver of the one or more sidelink transmissions.

In a ninth aspect, the method of aspect 1 includes determining the CC index for at least one of the first sidelink transmission with the second UE and the Uu transmission with the network entity further comprises determining the CC index based on a preconfigured rule-based indication.

In a tenth aspect, the method of aspect 1 includes determining a physical uplink control channel (PUCCH) group based on the CC index for at least one of the first sidelink transmission with the second UE and the Uu transmission with the network entity.

In an eleventh aspect, the method of any of aspects 1 and 10 include the PUCCH group is associated with a single CC in which a PUCCH is transmitted.

In a twelfth aspect, the method of aspect 1 includes determining a physical sidelink feedback channel (PSFCH) group based on the CC index for at least one of the first sidelink transmission with the second UE and the Uu transmission with the network entity.

In a thirteenth aspect, the method of aspect 1 includes the first sidelink transmission corresponds to at least one of a physical sidelink control channel (PSCCH), physical sidelink shared channel (PSSCH), physical sidelink feedback channel (PSFCH), sidelink channel state information reference signal (SL CSI-RS), or SL-CSI report.

In a fourteenth aspect, the method of aspect 1 includes the Uu transmission corresponds to at least one of an acknowledgement (ACK)/negative acknowledgement (NACK) in response to receipt of a sidelink ACK/NACK from the second UE, a report of sidelink channel state information/positioning state information (CSI/PSI) transmitted in response to a receipt of the SL CSI/PSI, or a measurement of received sidelink channel state information reference signal (SL CSI-RS)/sidelink position reference signal (SL PRS).

In a fifteenth aspect, a method is performed by a network entity. The method includes transmitting a cross-carrier scheduling indication to a first user equipment (UE), the cross-carrier scheduling indication including one or more carrier indicator fields (CIFs) configured to determine a component carrier (CC) index for at least one of a first sidelink transmission between the first UE and a second UE and a Uu transmission with a network entity, the CC index indicating one or more CCs among which at least one of the first sidelink transmission and the Uu transmission occur; and receiving the Uu transmission from the first UE in response to transmitting the cross-carrier scheduling indication, wherein the Uu transmission occurs on the one or more CCs.

In a sixteenth aspect, the method of aspect 15 includes the cross-carrier scheduling indication corresponds to a physical downlink control channel (PDCCH) transmission transmitted on a first CC of the group of CCs.

In a seventeenth aspect, the method of any of aspects 15 and 16 include the one or more CIFs indicate a group of CCs, and wherein at least one of the first sidelink transmission and the Uu transmission occur in one or more CCs of the group of CCs.

In an eighteenth aspect, the method of any of aspects 15 and 16 include the one or more CIFs are included in at least one downlink control information (DCI) of the cross-carrier scheduling indication.

In a nineteenth aspect, the method of any of aspects 15 and 16 include the cross-carrier scheduling indication of the CC index is included in at least one of a Uu media access control (MAC) control element (CE), a downlink control information (DCI) or a second sidelink transmission.

In a twentieth aspect, the method of any of aspects 15, 16, and 19 include the second sidelink transmission corresponds to at least one of a physical sidelink control channel (PSCCH), a sidelink control information 1 (SCI1), an Nth stage SCI (SCI-N), a physical sidelink shared channel (PSSCH), or a sidelink media access control (MAC) control element (CE).

In a twenty first aspect, the method of any of aspects 15 and 16 include the cross-carrier scheduling indication of the CC index is received at least one of by the first UE corresponding to a transmitter of one or more sidelink transmissions and a second UE corresponding to a receiver of the one or more sidelink transmissions.

In a twenty second aspect, the method of aspect 15 includes the CC index for at least one of the first sidelink transmission with the second UE and the Uu transmission with the network entity is based on a preconfigured rule-based indication.

In a twenty third aspect, the method of aspect 15 includes determining a physical uplink control channel (PUCCH) group based on the CC index for at least one of the first sidelink transmission with the second UE and the Uu transmission with the network entity.

In a twenty fourth aspect, the method of any of aspects 15 and 23 include the PUCCH group is associated with a single CC in which a PUCCH is received.

In a twenty fifth aspect, the method of aspect 15 includes determining a physical sidelink feedback channel (PSFCH) group based on the CC index for at least one of the first sidelink transmission with the second UE and the Uu transmission with the network entity.

In a twenty sixth aspect, the method of any of aspects 15 and 26 include determining that a cross CC transmission is scheduled for a first CC and a second CC, wherein the first CC differs from the second CC; determining that the first CC and the second CC are associated with the PSFCH group; and enabling scheduling of the cross CC transmission for the first CC and the second CC based on the determination that the first CC and the second CC are associated with the PSFCH group.

In a twenty seventh aspect, the method of aspect 15 includes the first sidelink transmission corresponds to at least one of a physical sidelink control channel (PSCCH), physical sidelink shared channel (PSSCH), physical sidelink feedback channel (PSFCH), sidelink channel state information reference signal (SL CSI-RS), or SL-CSI report.

In a twenty eighth aspect, the method of aspect 15 includes the Uu transmission corresponds to at least one of an acknowledgement (ACK)/negative acknowledgement (NACK) in response to receipt of a sidelink ACK/NACK from the second UE, a report of sidelink channel state information/positioning state information (CSI/PSI) transmitted in response to a receipt of the SL CSI/PSI, or a measurement of received sidelink channel state information reference signal (SL CSI-RS)/sidelink position reference signal (SL PRS).

In a twenty ninth aspect, an apparatus for wireless communication at a first user equipment (UE) comprises a transceiver; a memory configured to store instructions; and one or more processors communicatively coupled with the transceiver and the memory. The one or more processors are configured to execute the instructions to determine a component carrier (CC) index for at least one of a first sidelink transmission with a second UE and a Uu transmission with a network entity, the CC index indicating one or more CCs among which at least one of the first sidelink transmission and the Uu transmission occur; and communicate at least one of the first sidelink transmission to the second UE and the Uu transmission to the network entity based on the CC index.

In a thirtieth aspect, an apparatus for wireless communication at a network entity, comprising a transceiver; a memory configured to store instructions; and one or more processors communicatively coupled with the transceiver and the memory. The one or more processors are configured to execute the instructions to transmit a cross-carrier scheduling indication to a first user equipment (UE), the cross-carrier scheduling indication including one or more carrier indicator fields (CIFs) configured to determine a component carrier (CC) index for at least one of a first sidelink transmission between the first UE and a second UE and a Uu transmission with a network entity, the CC index indicating one or more CCs among which at least one of the first sidelink transmission and the Uu transmission occur; and receive the Uu transmission from the first UE in response to transmitting the cross-carrier scheduling indication, wherein the Uu transmission occurs on the one or more CCs.

Further examples include An apparatus for wireless communication, comprising: a memory configured to store instructions; and one or more processors communicatively coupled with the memory, wherein the one or more processors are configured to execute the instructions to perform the operations of one or more of the methods described herein.

Additional examples include a receiver node device for wireless communication, comprising means for performing the operations of one or more of the methods described herein.

Further examples include a non-transitory computer-readable medium storing instructions executable by one or more processors to perform the operations of one or more of the methods described herein.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
   receiving a multi-component carrier (CC) grant comprising a cross-carrier scheduling indication from a network entity, the cross-carrier scheduling indication including one or more carrier indicator fields (CIFs), wherein a CIF of the one or more CIFs indicates a group of CCs;
   determining a CC index for a first sidelink transmission with a second UE and a Uu transmission with the network entity based on the cross-carrier scheduling indication, and wherein at least one of the first sidelink transmission and the Uu transmission occur in one or more CCs of the group of CCs; and
   communicating the first sidelink transmission to the second UE and the Uu transmission to the network entity based on the CC index.

2. The method of claim 1, wherein the multi-CC grant schedules resources for a physical sidelink control channel (PSCCH), a physical sidelink shared channel (PSSCH), a physical sidelink feedback channel (PSFCH), and a physical uplink control channel (PUCCH), wherein the first sidelink transmission comprises a transmission on the PSCCH or the PSSCH and the Uu transmission comprises a transmission on the PUCCH.

3. The method of claim 1, wherein the cross-carrier scheduling indication corresponds to a physical downlink control channel (PDCCH) transmission received on a first CC.

4. The method of claim 2, wherein the multi-CC grant schedules the PSCCH on a first CC, the PSSCH on a second CC, the PSFCH on a third CC, and the PUCCH on a fourth CC, wherein the first CC, the second CC, the third CC, and the fourth CC comprises different CCs.

5. The method of claim 1, wherein the one or more CIFs are included in at least one downlink control information (DCI) of the cross-carrier scheduling indication.

6. The method of claim 1, wherein the cross-carrier scheduling indication of the CC index is included in at least one of a Uu media access control (MAC) control element (CE) or a downlink control information (DCI).

7. The method of claim 1, wherein determining the CC index for at least one of the first sidelink transmission with the second UE and the Uu transmission with the network entity further comprises determining the CC index based on a preconfigured rule-based indication.

8. The method of claim 1, further comprising determining a physical uplink control channel (PUCCH) group based on the CC index for at least one of the first sidelink transmission with the second UE and the Uu transmission with the network entity.

9. The method of claim 8, wherein the PUCCH group is associated with a single CC in which a PUCCH is transmitted.

10. The method of claim 1, further comprising determining a physical sidelink feedback channel (PSFCH) group based on the CC index for at least one of the first sidelink transmission with the second UE and the Uu transmission with the network entity wherein the PSFCH group comprise a group of sidelink CCs for which the PSFCH is sent only in a specific CC corresponding to the PSFCH group.

11. The method of claim 1, wherein the first sidelink transmission corresponds to at least one of a physical sidelink control channel (PSCCH), physical sidelink shared channel (PSSCH), physical sidelink feedback channel (PSFCH), sidelink channel state information reference signal (SL CSI-RS), or SL-CSI report.

12. The method of claim 1, wherein the Uu transmission corresponds to at least one of an acknowledgement (ACK)/negative acknowledgement (NACK) in response to receipt of a sidelink ACK/NACK from the second UE, a report of sidelink channel state information/positioning state information (CSI/PSI) transmitted in response to a receipt of the SL CSI/PSI, or a measurement of received sidelink channel state information reference signal (SL CSI-RS)/sidelink position reference signal (SL PRS).

13. A method of wireless communication at a network entity, comprising:
transmitting a multi-component carrier (CC) grant comprising a cross-carrier scheduling indication to a first user equipment (UE), the cross-carrier scheduling indication including one or more carrier indicator fields (CIFs) configured to determine a CC index for a first sidelink transmission between the first UE and a second UE and a Uu transmission with a network entity, wherein a CIF of the one or more CIFs indicates a group of CCs, and wherein at least one of the first sidelink transmission and the Uu transmission occur in one or more CCs of the group of CCs; and
receiving the Uu transmission from the first UE in response to transmitting the cross-carrier scheduling indication, wherein the Uu transmission occurs on the one or more CCs.

14. The method of claim 13, wherein the cross-carrier scheduling indication corresponds to a physical downlink control channel (PDCCH) transmission transmitted on a first CC.

15. The method of claim 14, wherein the one or more CIFs are included in at least one downlink control information (DCI) of the cross-carrier scheduling indication.

16. The method of claim 13, wherein the cross-carrier scheduling indication of the CC index is included in at least one of a Uu media access control (MAC) control element (CE) or a downlink control information (DCI).

17. The method of claim 13, wherein the multi-CC grant schedules resources for a physical sidelink control channel (PSCCH), a physical sidelink shared channel (PSSCH), a physical sidelink feedback channel (PSFCH), and a physical uplink control channel (PUCCH), wherein the first sidelink transmission comprises a transmission on the PSCCH or the PSSCH and the Uu transmission comprises a transmission on the PUCCH.

18. The method of claim 17, wherein the multi-CC grant schedules the PSCCH on a first CC, the PSSCH on a second CC, the PSFCH on a third CC, and the PUCCH on a fourth CC, wherein the first CC, the second CC, the third CC, and the fourth CC comprises different CCs.

19. The method of claim 13, wherein the CC index for at least one of the first sidelink transmission with the second UE and the Uu transmission with the network entity is based on a preconfigured rule-based indication.

20. The method of claim 13, further comprising determining a physical uplink control channel (PUCCH) group based on the CC index for at least one of the first sidelink transmission with the second UE and the Uu transmission with the network entity.

21. The method of claim 20, wherein the PUCCH group is associated with a single CC in which a PUCCH is received.

22. The method of claim 13, further comprising determining a physical sidelink feedback channel (PSFCH) group based on the CC index for at least one of the first sidelink transmission with the second UE and the Uu transmission with the network entity wherein the PSFCH group comprise a group of sidelink CCs for which the PSFCH is sent only in a specific CC corresponding to the PSFCH group.

23. The method of claim 22, further comprising:
determining that a cross CC transmission is scheduled for a first CC and a second CC, wherein the first CC differs from the second CC;
determining that the first CC and the second CC are associated with the PSFCH group; and
enabling scheduling of the cross CC transmission for the first CC and the second CC based on the determination that the first CC and the second CC are associated with the PSFCH group.

24. The method of claim 13, wherein the first sidelink transmission corresponds to at least one of a physical sidelink control channel (PSCCH), physical sidelink shared channel (PSSCH), physical sidelink feedback channel (PSFCH), sidelink channel state information reference signal (SL CSI-RS), or SL-CSI report.

25. The method of claim 13, wherein the Uu transmission corresponds to at least one of an acknowledgement (ACK)/negative acknowledgement (NACK) in response to receipt of a sidelink ACK/NACK from the second UE, a report of sidelink channel state information/positioning state information (CSI/PSI) transmitted in response to a receipt of the SL CSI/PSI, or a measurement of received sidelink channel state information reference signal (SL CSI-RS)/sidelink position reference signal (SL PRS).

26. An apparatus for wireless communication at a first user equipment (UE), comprising:
a transceiver;
a memory configured to store instructions; and
one or more processors communicatively coupled with the transceiver and the memory, wherein the one or more processors are configured to execute the instructions to:
receiving a multi-component carrier (CC) grant comprising a cross-carrier scheduling indication from a network entity, the cross-carrier scheduling indication including one or more carrier indicator fields (CIFs), wherein a CIF of the one or more CIFs indicates a group of CCs:
determine a CC index for a first sidelink transmission with a second UE and a Uu transmission with the network entity, and wherein at least one of the first sidelink transmission and the Uu transmission occur in one or more CCs of the group of CCs; and
communicate the first sidelink transmission to the second UE and the Uu transmission to the network entity based on the CC index.

27. An apparatus for wireless communication at a network entity, comprising:
a transceiver;
a memory configured to store instructions; and one or more processors communicatively coupled with the transceiver and the memory, wherein the one or more processors are configured to execute the instructions to:
- transmit a multi-component carrier (CC) grant comprising a cross-carrier scheduling indication to a first user equipment (UE), the cross-carrier scheduling indication including one or more carrier indicator fields (CIFs) configured to determine a CC index for a first sidelink transmission between the first UE and a second UE and a Uu transmission with a network entity, wherein a CIF of the one or more CIFs indicates a group of CCs, and wherein at least one of the first sidelink transmission and the Uu transmission occur in one or more CCs of the group of CCs; and
- receive the Uu transmission from the first UE in response to transmitting the cross-carrier scheduling indication, wherein the Uu transmission occurs on the one or more CCs.

* * * * *